April 2, 1946.    E. E. BROSIUS    2,397,530
MANIPULATOR
Filed July 8, 1943    2 Sheets-Sheet 1

INVENTOR
Edgar E. Brosius
by his attorneys
Stebbins, Blenko & Webb

Patented Apr. 2, 1946

2,397,530

UNITED STATES PATENT OFFICE 2,397,530

MANIPULATOR

Edgar E. Brosius, Pittsburgh, Pa.

Application July 8, 1943, Serial No. 493,890

5 Claims. (Cl. 214—131)

This invention relates to manipulators for handling material, particularly in industrial plants. While such manipulators have wide and varied utility, they are extensively used for the purpose of charging work to and withdrawing the same from heating furnaces. In the use of such manipulators it is desired at times to alter the elevation of the material handling portion of the manipulator while maintaining its orientation, i. e. holding it against tilting or angular displacement. At other times it is desirable to tilt the material handling portion of the manipulator. Various mechanisms for accomplishing these functions have heretofore been provided.

I provide a novel and extremely simple, inexpensive and foolproof structure for enabling alteration of the elevation of the material handling portion of a manipulator while maintaining the orientation thereof and for tilting the material handling portion when desired. I provide, in a manipulator, a material handling portion, mounting means for the material handling portion, means for shifting the mounting means to alter the elevation of the material handling portion and means for differentially shifting the mounting means to tilt the material handling portion.

Preferably, I employ parallel motion mechanism for altering the elevation of the material handling portion while maintaining its orientation. I also preferably provide means for tilting the parallel motion mechanism to tilt the material handling portion. The material handling portion may, for example, be mounted on a mounting member through a parallel motion linkage and the orientation of the mounting member may be altered to tilt the material handling portion. To alter the elevation of the material handling portion while maintaining its orientation the parallel motion linkage may be operated with the mounting member remaining stationary.

Other details, objects and advantages of the invention will become apparent as the following description of a present preferred embodiment thereof proceeds.

Figure 1:
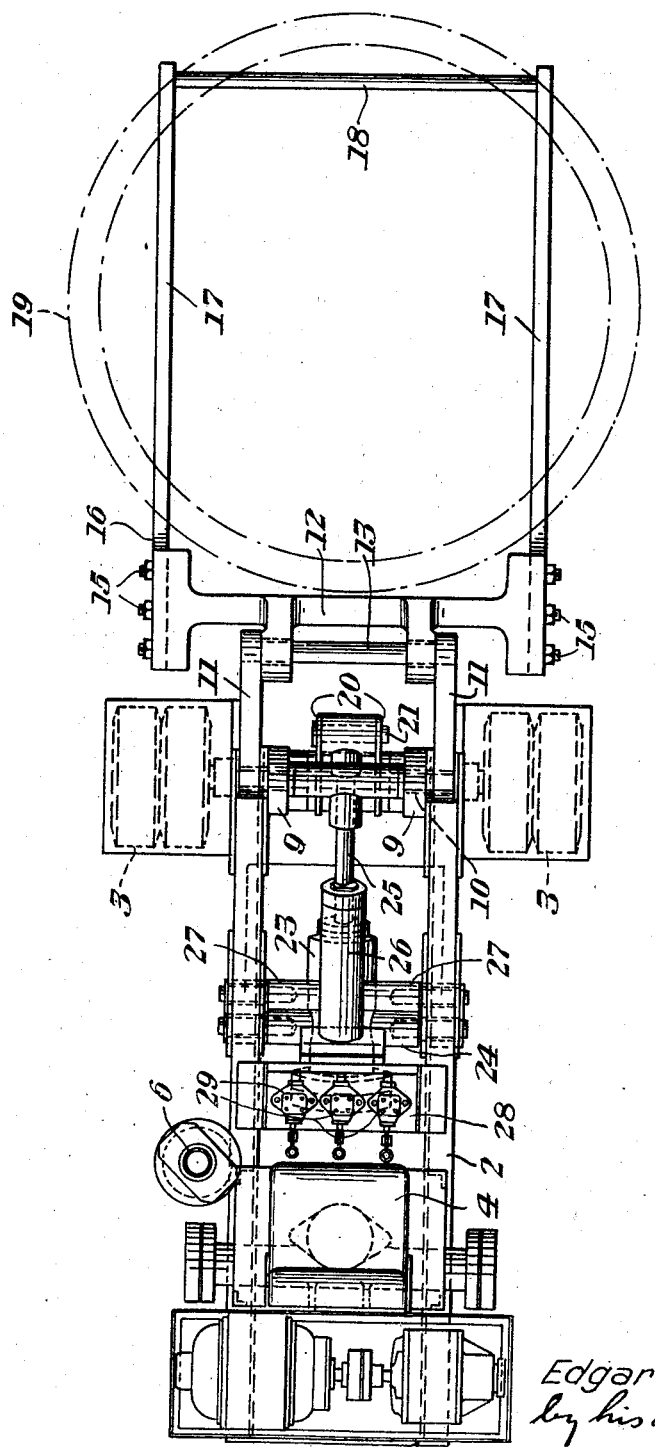
Figure 2:
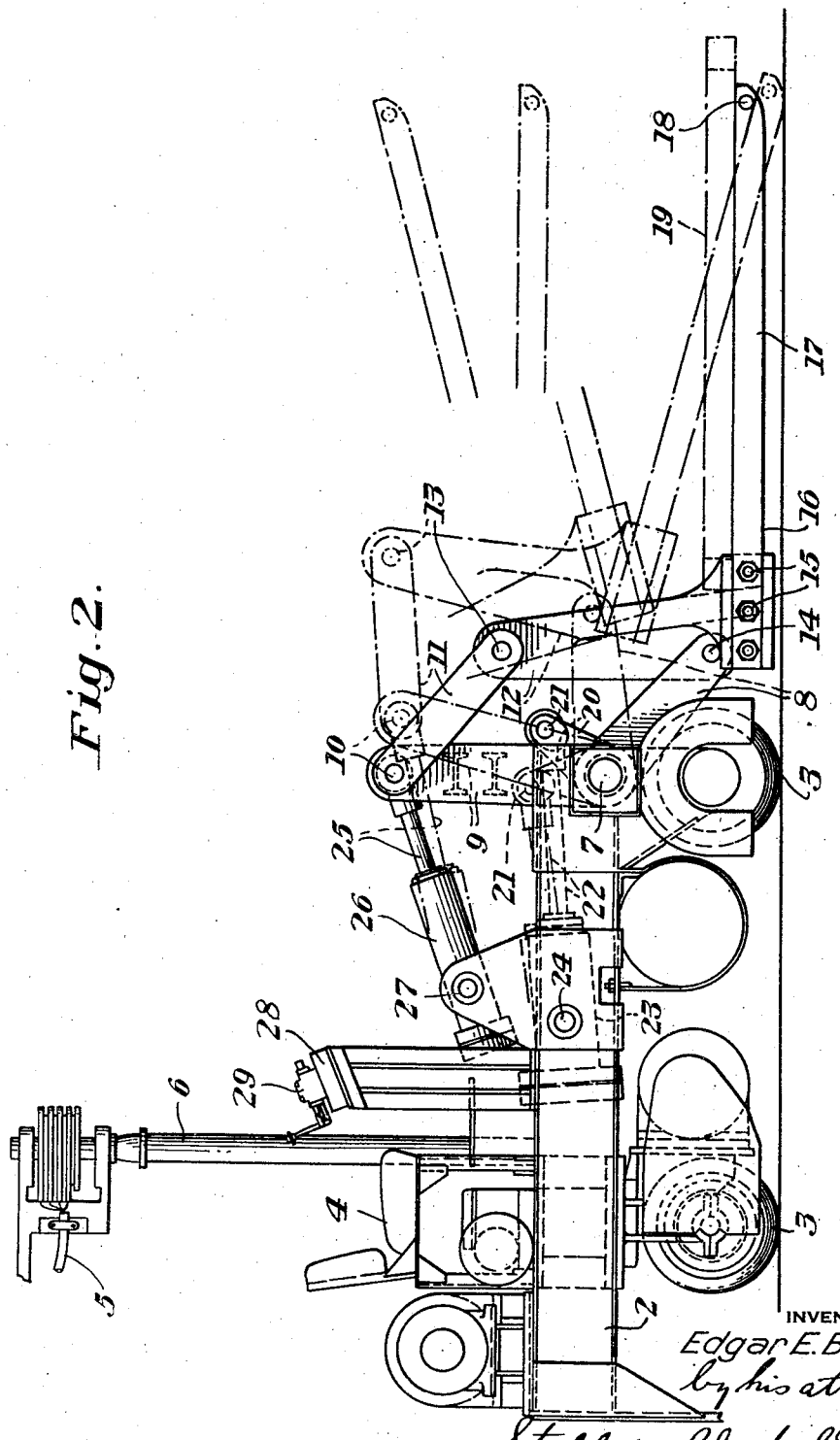

In the accompanying drawings I have shown a present preferred embodiment of the invention, in which Figure 1 is a top plan view of a manipulator showing a ring shaped article being handled thereby; and Figure 2 is a side elevational view of the manipulator shown in Figure 1.

Referring now more particularly to the drawings, there is shown a manipulator having a main frame or body 2 mounted upon wheels 3 and having an operator's seat 4. The manipulator is electrically operable from a remote source of current delivered to the manipulator through a cable 5 and a mast 6 as well known in the art. The manipulator is operable by an electric motor geared to one of the wheel shafts, also as well known. An electric motor also drives a pump or compressor for supplying fluid under pressure for operation of the material handling portion of the manipulator. The structure thus far described is all well known in the art.

Journalled in the main frame or body 2 of the manipulator is a shaft 7. Fixed to the shaft 7 adjacent opposite ends thereof are two parallel levers 8. Loosely pivoted upon the shaft 7 are two spaced upstanding mounting members 9. Pivoted to each mounting member 9 at its upper end by a shaft 10 is a link 11. The respective links 11 extend parallel to the levers 8. A bracket 12 is pivoted to the links 11 by a shaft 13 and to the levers 8 by a shaft 14. The plane defined by the axes of the shafts 7 and 10 is parallel to the plane defined by the axes of the shafts 13 and 14. Thus for any fixed position of the mounting members 9 the orientation of the bracket 12 remains constant, but through change of angularity relative to the mounting members 9 of the levers 8 and links 11 the elevation of the bracket 12 may be altered, as will presently be described.

Connected with the bracket 12 at 15 is a material handling portion 16 illustrated as constituting opposed projecting supporting bars 17 connected at their ends by a cross rod 18. Work in the form of a ring 19 is shown as resting on the material handling portion 16. Since the material handling portion 16 is rigidly connected with the bracket 12 it partakes of whatever movement is imparted to the bracket.

Fixed to the shaft 7 is a lever 20. Pivoted to the lever 20 at 21 is the piston rod 22 of a piston operating in a fluid pressure cylinder 23 mounted in the main frame upon trunnions 24. Fluid connections (not shown) lead in usual manner from the pump or compressor to the cylinder 23 so that fluid under pressure can be admitted either in front of or behind the cylinder to move the piston as desired.

When it is desired to alter the elevation of the material handling portion 16 while maintaining its orientation the piston in the cylinder 23 is operated to turn through the lever 20 the shaft 7. Since the levers 8 are fixed to the shaft 7 they are swung about the axis of the shaft upon turning of the shaft, the links 11 partaking of similar movement since they must always remain in parallelism to the levers 8. This causes the bracket 12 and the material handling portion 16 to rise and fall as desired, but not to tilt.

Pivoted to the shaft 10 is the piston rod 25 of a piston operating in a fluid pressure cylinder 26 mounted in the main frame upon trunnions 27. Fluid is admitted to the cylinder 26 similarly to the manner in which it is admitted to the cylinder 23 so that the piston in the cylinder 26 may be advanced and retracted as desired. When the piston is advanced it moves the upper ends of the mounting members 9 toward the right, viewing Figure 2, resulting in tilting of the entire assembly constituting the levers 8, the links 11, the bracket 12 and the material handling portion 16.

Thus by operation of the piston in the cylinder 23 the elevation of the material handling portion of the manipulator may be altered and by operation of the piston in the cylinder 26 the material handling portion may be tilted. Preferably the operator of the manipulator sits in the seat 4 and controls the operations through a control panel 28 having fluid valves 29 mounted thereon. A separate valve is preferably provided for each of the cylinders 23 and 26 so that a skilled operator can simultaneously, when desired, alter the elevation of the material handling portion 16 and tilt the same. For example, the transition from the full line position to the chain line position of the parts in Figure 2 may be effected by successive raising and tilting steps or by simultaneously operating the raising and tilting means so that the parts partake of a motion which is the resultant of the separate raising and tilting motions.

By the mechanism above described I accomplish in an extremely simple and effective way and at remarkably low cost functions in a manipulator which have heretofore been accomplished only with relatively expensive and complicated equipment. My manipulator is ideally suited for the handling of work to and from heating furnaces where it is subjected to great heat. Its construction and simplicity insure satisfactory operation even under severe heat conditions. The manipulator is largely free of parts or mechanisms which are likely to become out of order and it performs the functions described most effectively.

While I have shown and described a present preferred embodiment of the invention it is to be distinctly understood that the invention is not limited thereto but may be otherwise variously embodied within the scope of the following claims.

I claim:

1. In a manipulator, a pivot, a link pivotally carried by the pivot, a second link parallel to the first mentioned link, cross links connecting said first and second mentioned links to form a parallel motion linkage, material handling means carried by one of said first and second mentioned links and means for tilting said first mentioned link about said pivot to alter the orientation of said linkage and of said material handling means.

2. In a manipulator, a material handling member of generally L shape, a link parallel to one arm of said material handling member, cross links connecting said link and arm to form a parallel motion linkage and means for altering the orientation of said linkage to tilt said material handling member.

3. In a manipulator, a shaft, a link loosely pivoted to said shaft, a second link parallel to the first mentioned link, cross links connecting said first and second mentioned links to form a parallel motion linkage, one of said cross links being non-rotatable with respect to said shaft, material handling means carried by one of said first and second mentioned links, turning of said shaft causing shifting of the material handling means while maintaining the same in fixed orientation, and means for tilting one of said first and second mentioned links to alter the orientation of the material handling means.

4. In a manipulator, a pair of parallel links, a material handling member rigidly connected with one of said links, cross links connecting said parallel links to form a parallel motion linkage, a lever non-rotatable with respect to one of said cross links for operating the parallel motion linkage to shift the material handling member while maintaining it in fixed orientation and means for tilting one of said parallel links to alter the orientation of the parallel motion linkage and of the material handling member.

5. In a manipulator, a first pivot, a second pivot, a link carried by said pivots, a second link parallel to said first mentioned link, cross links connecting said first and second mentioned links to form a parallel motion linkage, each cross link being pivoted about the axis of one of said pivots, material handling means carried by one of said first and second mentioned links, means for turning one of the cross links about the axis of the first mentioned pivot to operate the parallel motion linkage to shift the material handling means while maintaining it in fixed orientation and means for shifting the second mentioned pivot transversely of its axis to tilt the parallel motion linkage and alter the orientation of the material handling means.

EDGAR E. BROSIUS.